(12) United States Patent
Bowers

(10) Patent No.: US 8,740,665 B1
(45) Date of Patent: Jun. 3, 2014

(54) PORTABLE COCKPIT YOKE ASSEMBLY FOR MOUNTING ON A RADIO CONTROLLED TRANSMITTER USED WITH A MODEL AIRPLANE

(76) Inventor: Richard A. Bowers, Highlands Ranch, CO (US)

( * ) Notice: Subject to any disclaimer, the term of this patent is extended or adjusted under 35 U.S.C. 154(b) by 198 days.

(21) Appl. No.: 13/466,577

(22) Filed: May 8, 2012

(51) Int. Cl.
*A63H 27/00* (2006.01)
(52) U.S. Cl.
USPC .......................................................... 446/34
(58) Field of Classification Search
USPC .......................................................... 446/34
See application file for complete search history.

(56) References Cited

U.S. PATENT DOCUMENTS

| | | | | |
|---|---|---|---|---|
| 2,371,626 | A * | 3/1945 | Kecskemeti | 73/503 |
| 2,696,955 | A * | 12/1954 | Brown | 244/63 |
| 3,217,221 | A * | 11/1965 | Heggen et al. | 318/722 |
| 3,227,399 | A * | 1/1966 | Dastoli et al. | 244/2 |
| 3,488,427 | A * | 1/1970 | Anthony | 73/178 R |
| 4,386,914 | A * | 6/1983 | Dustman | 434/32 |
| 5,344,354 | A * | 9/1994 | Wiley | 446/7 |
| 5,601,408 | A * | 2/1997 | Hunter et al. | 416/134 A |
| 5,878,981 | A * | 3/1999 | Dewey | 244/190 |
| 6,331,114 | B1 * | 12/2001 | Massey | 434/32 |
| 6,851,950 | B1 * | 2/2005 | Gamnig | 434/45 |
| 8,215,583 | B2 * | 7/2012 | Groomes et al. | 244/129.1 |

* cited by examiner

*Primary Examiner* — Kurt Fernstrom
*Assistant Examiner* — Dolores Collins
(74) *Attorney, Agent, or Firm* — Edwin H. Crabtree; Ramon L. Pizarro

(57) ABSTRACT

A cockpit yoke assembly adapted for mounting on top of a RC transmitter for controlling the operation of a model airplane. The yoke assembly includes a first control arm with a throttle knob. The first control arm is attached to a first ball and socket linkage adapted for attachment a first joystick on the transmitter. A rudder control lever is attached to the first control arm. The yoke assembly includes a second control arm with an elevator knob. The second control arm is attached to a second ball and socket linkage adapted for attachment to a second joystick on the transmitter. An aileron control lever is attached to the second control arm. The first and second ball and socket linkage are used for moving the first and second joysticks fore or aft and left or right during the operation of the model airplane.

20 Claims, 3 Drawing Sheets

PORTABLE COCKPIT YOKE ASSEMBLY FOR MOUNTING ON A RADIO CONTROLLED TRANSMITTER USED WITH A MODEL AIRPLANE

BACKGROUND OF THE INVENTION (a) Field of the Invention

This invention relates to a mechanical device for an operation of a standard radio controlled transmitter or RC transmitter used for controlling a model airplane during take off, in flight and landing, and more particularly, but not by way of limitation, to a portable, cockpit yoke assembly adapted for mounting on top of the RC transmitter. The yoke assembly provides for positive control of the airplane and eliminates a model airplane operator or pilot using his or her thumbs for operating a pair of joysticks on the RC transmitter.

(b) Discussion of Prior Art

In U.S. patents, U.S. Pat. No. 4,386,914 to Dustman, U.S. Pat. No. 5,878,981 to Dewey, and U.S. Pat. No. 6,331,114 to Massey, three different types of mechanical and electrical transmitter extension apparatus and flight console are described to operate a remote controlled model airplane. These apparatus and console are large and complex in design and similar to an actual aircraft flight simulator used for training commercial and military pilots. Also, the prior art simulator-like apparatus are floor mounted, they are not portable nor are they adapted to be hand carried and mounted on top of a standard RC transmitter.

In the hobby of flying a model airplane, a RC transmitter is used for controlling and flying the airplane. A receiver is mounted in the airplane for receiving commands from the transmitter operated by a model airplane operator or pilot. Today, a standard RC transmitter, which can operate on any number of selected radio channels, uses a pair of joysticks to send commands to the airplane. The left joystick is moved fore or aft by the pilot's left thumb for operating the plane's throttle and applying power thereto. Also, the left thumb is used to move the left joystick left or right for operating the plane's rudder and changing the direction of the plane. The right joystick is moved fore or aft by the pilot's right thumb for operating the plane's elevators and climbing or descending the plane. Also, the right thumb is used to move the joystick left or right for operating the plane's ailerons and banking the plane.

A key problem with operating the two joysticks is a novice or inexperienced model plane pilot will often move, for example, the left joystick with his or her thumb and cause the plane to speed up or slow down and then inadvertently slip into turning the plane's direction at virtually the same time. Also, the pilot will often move the right joystick with his or her thumb and cause the plane to climb or descend and then inadvertently slip into banking the plane at virtually the same time. The subject invention is designed to prevent this operator error by eliminating the control of the two joysticks by the model plane pilot.

SUMMARY OF THE INVENTION

In view of the foregoing, it is a primary objective of the subject invention to eliminate a direct contact of a pair of joysticks on a standard RC receiver by the thumb and fingers of a model plane pilot and provide a positive and improved operation of a model airplane.

Another object of the invention is the cockpit yoke assembly is lightweight, portable and can be quickly and easily mounted on top of a standard RC Transmitter with mechanical linkage adapted for attachment to the transmitter's two joysticks.

Still another object of the subject yoke assembly is to provide a hand grip, a throttle control knob, an elevator control knob, a rudder control lever and an aileron control lever, which are similar to the cockpit controls found in today's airplanes.

The portable cockpit yoke assembly includes a yoke body with a vertical yoke post. The post is adapted for mounting on top of a standard RC transmitter. A hand grip, with a pair of hand grip handles, is mounted in front of the yoke body.

A horizontal, first control arm, with a throttle knob mounted on one end of the first control arm, is slidably mounted in the front of the yoke body. The first control arm is attached to a first ball and socket linkage. The first ball and socket linkage is adapted for threadable attachment to a top of a first joystick or left joystick on the transmitter and for moving the first joystick fore or aft and left or right. A rudder control lever is also attached to the first control arm.

A horizontal, second control arm, with an elevator knob mounted on one end of the second control arm, is slidably mounted in the front of the yoke body. The second control arm is attached to a second ball and socket linkage. The second ball and socket linkage is adapted for threadable attachment to a top of a second joystick or right joystick on the transmitter for moving the second joystick fore or aft and left or right. An aileron control lever is also attached to the second control arm.

These and other objects of the present invention will become apparent to those familiar with the operation of flying a model airplane when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments in the present invention according to the best modes presently devised for a practical application of the subject cockpit yoke assembly when used in operating a model airplane, and in which.

DETAILED DESCRIPTION OF THE PREFERRED EMBODIMENTS

Figure 1:
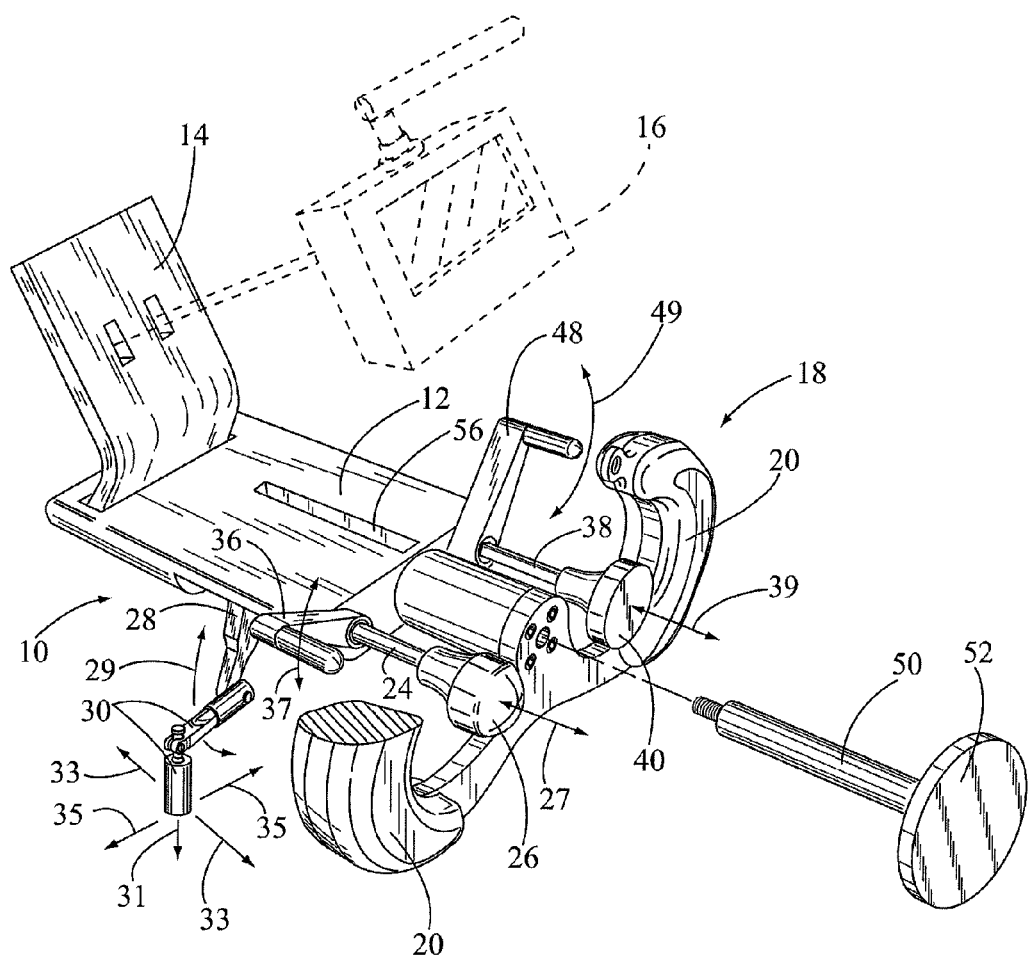
FIG. 1 is a perspective view of the subject portable, cockpit yoke assembly. An electronic telemetry unit, used for tracking a model airplane during flight, is shown in dashed lines positioned for mounting on top of the yoke assembly.

In FIG. 1, the portable cockpit yoke assembly is shown having general reference numeral 10. The yoke assembly 10 includes a yoke body 12 with an upwardly extending dashboard 14. The dashboard 14 can be used for mounting an electronic telemetry unit 16 thereon. The telemetry unit 16 is shown in dashed line. The telemetry unit 16 is used for keeping track of a model airplane during flight. The model airplane isn't shown in the drawings.

Mounted in front of the yoke body 12 is a hand grip, having general reference numeral 18. The hand grip 18 includes a pair of hand grip handles 20, which are held by a model airplane operator or pilot 22. The pilot 22 is shown in dashed lines in FIG. 4. The hand grip 18 is stationary and is not used for controlling the model airplane. A portion of the left hand grip handle 20 has been cutaway to help illustrate the controls of the yoke assembly 10.

A horizontal, first control arm 24 is slidably mounted, as indicated by arrow 27, in the front of the yoke body 12 and includes a throttle knob 26. A first lever arm 28 is pivotally mounted, as indicated by arrow 29, on the first control arm 24. A first ball and socket linkage 30 is pivotally attached to the first lever arm 28. The first ball and socket linkage 30 is adapted for threadable attachment, as indicated by arrow 31, to a top of a first joystick or left joystick 32 on a standard radio controlled transmitter or RC transmitter, having general reference numeral 34. The first joystick 32 and transmitter 34 are shown in dashed lines in FIGS. 2 and 4. The first ball and socket linkage 30 is used to move the first joystick 32 fore or aft, as indicated by arrows 33, and move the first joy stick left or right, as indicated by arrows 35. Also, a rudder control lever 36 is attached to and pivotally operated on the first control arm 24.

Figure 3:
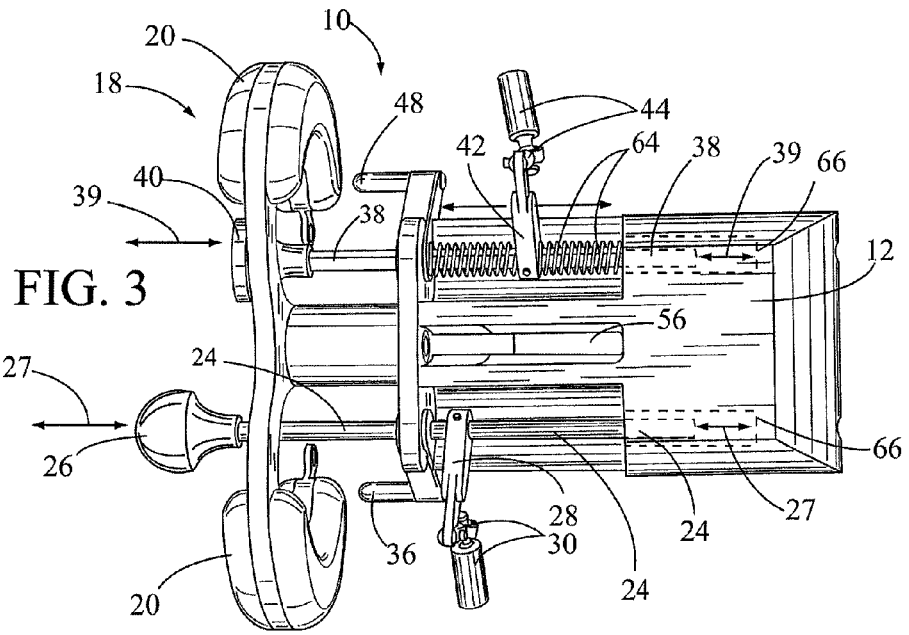
FIG. 3 is a bottom view of the yoke assembly and illustrating the mechanical linkage used for attachment to the two joysticks.

Referring now to both FIG. 1 and FIG. 3, a horizontal, second control arm 38 is slidably mounted, as indicated by arrow 39, in the front of the yoke body 12 and includes a elevator knob 40. A second lever arm 42 is pivotally mounted on the second control arm 38. A second ball and socket linkage 44 is pivotally attached to the second lever arm 42. The second ball and socket linkage 44 is adapted for threadable attachment to a top of a second joystick or left joystick 46 on the RC transmitter 34.

The second ball and socket linkage 44 is used to move the second joystick 46 fore or aft, as indicated by arrows 33, and move the second joy stick left or right, as indicated by arrows 35. Also, an aileron control lever 48 is attached to the second control arm 38.

Also shown in this drawing is a stomach rest 50 having a threaded end for attachment to the center of the hand grip 18. The stomach rest 50 includes a stomach engaging round plate 52 for placing against the model plane pilot's stomach for providing stability during the flight operation of the model plane.

Figure 2:
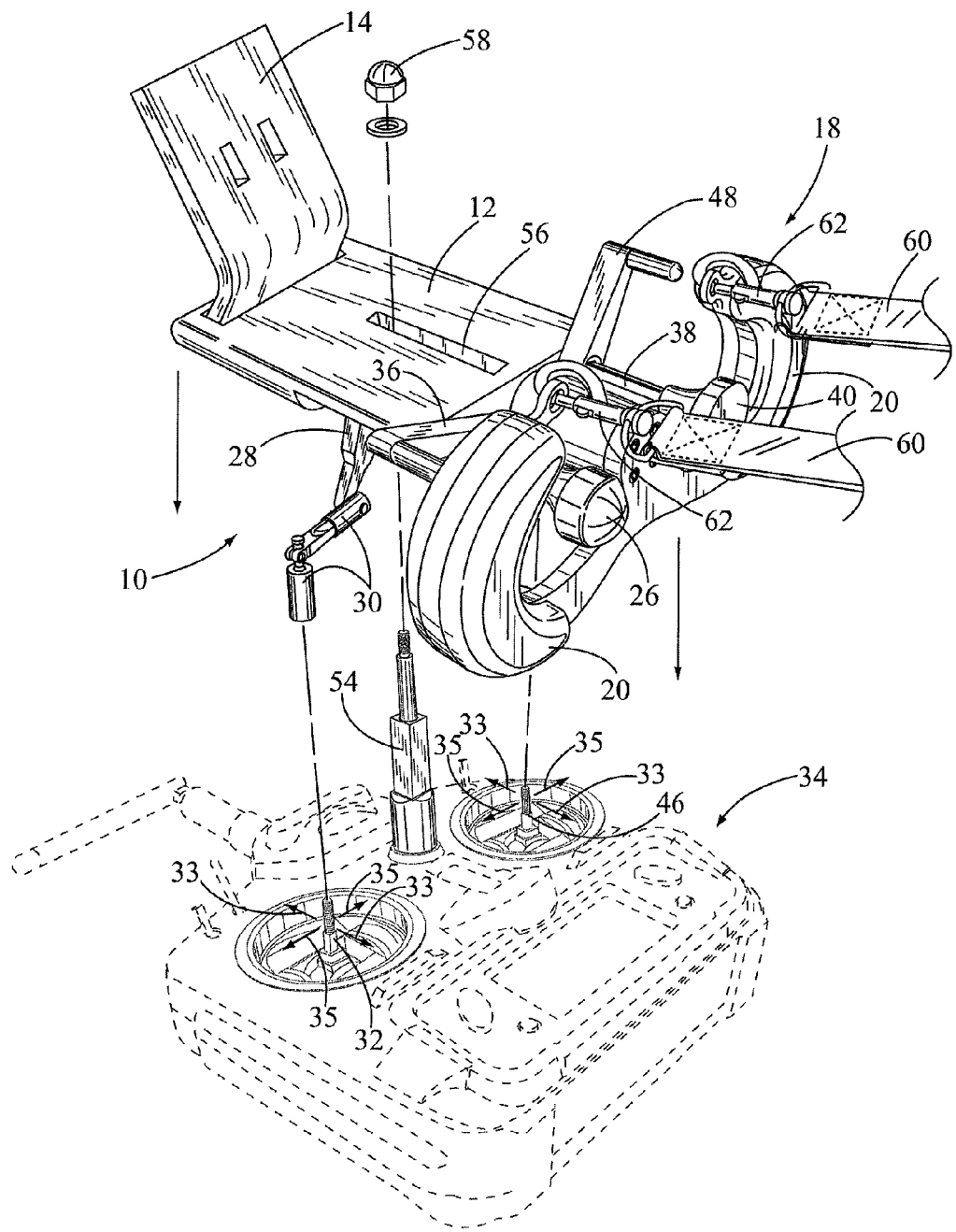
FIG. 2 is another perspective view of the yoke assembly, similar to FIG. 1, and positioned above a standard RC transmitter with a first or left joystick and a second or right joystick. The two joysticks are used for controlling the operation of the model airplane.

In FIG. 2, the yoke assembly 10 is shown disposed above the standard RC transmitter 34 with the first joystick 32 and the second joystick 44 positioned for threadable attachment to the first ball and socket linkage 30 and the second ball and socket linkage 44. In this drawing, a lower end of a vertical post 54 is attached to the top of the transmitter 34. An upper threaded end of the vertical post 54 is received through an elongated slot 56 in the yoke body 12 and attached to a threaded nut 58 for securing the yoke assembly 10 on top of the transmitter 34.

Also shown in this drawing is a shoulder strap 60 with strap fasteners 62 for attachment to the hand grip handles 20. The shoulder strap 60 is received around the neck of the pilot 22 and on top of his or her shoulders for supporting the cockpit yoke assembly 10 and the attached RC transmitter 34 thereon.

In FIG. 3, a bottom view of the yoke assembly 10 is shown illustrating the mechanical linkage used for attachment to the two joysticks 32 and 34. In this drawing, the second control arm 38 is shown having a coil spring 64 therearound. The coil spring 64 is designed to return the control arm 38 to a neutral position after the elevator knob 40 has been moved the second control arm 38 rearwardly or forwardly for raising and lowering the model airplane's elevators during flight.

Figure 4:
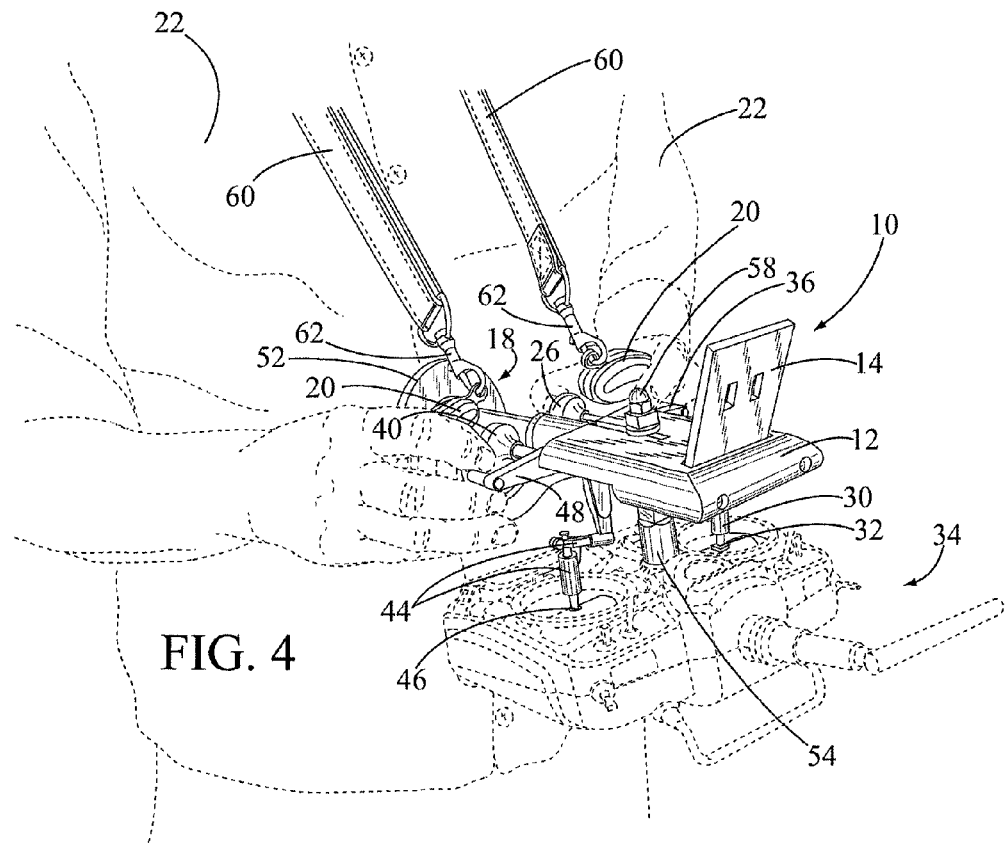
FIG. 4 is another perspective view of the yoke assembly mounted on top of the RC transmitter and held next to the stomach of a model plane operator or pilot.

In FIG. 4, a perspective view of an assembled cockpit yoke assembly 10 is shown mounted on the RC transmitter 34 and held next to the stomach of the model plane operator or pilot 22 for added stability. When using the yoke assembly, the pilot's hands can rest on the handle grip handles 20 and when not operating the controls of the model airplane.

During the take off of the airplane, power is turned "on" to the RC transmitter 34 and a radio channel is selected to communicate between the transmitter and the receiver mounted in the model airplane. The pilot 22 can now use his or her left hand for moving the throttle knob 26 and first control arm 24 forward for increasing the power to the plane during takeoff. The pilot 22 can also use his or her left hand to left hand for moving the rudder control lever 36 up and down, as indicated by arrow 37, shown in FIG. 1, for adjusting the plane's rudder and the direction of the plane onto the runway, during takeoff and during flight.

As the model airplane moves forward to take flight, the pilot 22 can now use his or her right hand to move the elevator knob 40 and the second control arm 38 rearward for adjusting the plane's elevators to begin to lift the plane into the air. When the plane has reached a selected altitude and speed, the pilot 22 can now use his or her right hand to move the aileron control lever 48 up or down, as indicated by arrow 49, shown in FIG. 1, for banking the plane either to the left or right and return the plane for landing.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

The embodiments of the invention for which as exclusive privilege and property right are claimed and defined as follows:

1. A cockpit yoke assembly for controlling a model airplane, the yoke assembly adapted for mounting on a standard radio controller transmitter or RC transmitter, the RC transmitter having a first joystick or left joystick for controlling the plane's throttle and rudder, the RC transmitter having a second joystick or left joystick for controlling the plane's elevators and ailerons, the yoke assembly comprising:

a yoke body adapted for mounting on top of the RC transmitter; a first control arm slidably mounted on the yoke body;

a throttle knob, attached to one end of the first control arm, for moving the first control arm forward and rearward on the yoke body;

first linkage means attached to the first control arm and adapted for attachment to the first joystick, whereby when the throttle knob is moved forward or rearward on the yoke body, the first linkage means for moving the first joystick fore or aft and controlling the throttle on the airplane;

a rudder control lever attached to the first control arm, whereby when the rudder control lever is moved upward or downward, the first linkage means for moving the first joystick left or fight and controlling the rudder on the airplane;

a second control arm slidably mounted on the yoke body;

an elevator knob attached to one end of the second control arm for moving the second control arm forward or rearward on the yoke body;

second linkage means attached to the second control arm and adapted for attachment to the second joystick, whereby when the elevator knob is moved forward or rearward on the yoke body, the second linkage means for moving the second joystick fore or aft and controlling the elevators on the airplane; and an aileron control lever attached to the second control arm, whereby when the elevator control lever is moved upward or downward, the second linkage means for moving the second joystick left or fight for controlling the ailerons on the airplane.

2. The yoke assembly as described in claim 1 wherein the first linkage means includes a first lever arm attached to the first control arm and a first ball and socket linkage attached to the first lever arm and adapted for attachment to the first joy stick.

3. The yoke assembly as described in claim 2 wherein the second linkage means includes a second lever arm attached to the second control arm and a second ball and socket linkage attached to the second lever arm and adapted for attachment to the second joy stick.

4. The yoke assembly as described in claim 1 wherein the second control arm includes a coil spring therearound for returning the second control arm to a neutral position after the second control arm has been moved forward or rearward.

5. The yoke assembly as described in claim 1 further including a vertical post having an upper end attached to the yoke body, a lower end of the vertical post is adapted for attachment to the top of the RC transmitter.

6. The yoke assembly as described in claim 1 further including a dashboard attached to the top of the yoke body and extending upwardly therefrom, the dashboard adapted for receiving a telemetry unit thereon.

7. The yoke assembly as described in claim 1 further including a hand grip mounted in front of the yoke body, the hand grip including a pair of hand grip handles.

8. The yoke assembly as described in claim 7 further including a stomach rest having a threaded end for attachment to a center of the hand grip, the stomach rest having a stomach engaging round plate adapted for placing against a model plane pilot's stomach and providing stability during the flight operation of the model plane.

9. The yoke assembly as described in claim 7 further including a shoulder strap having shoulder strap fasteners for attachment to the hand grip handles.

10. A cockpit yoke assembly for controlling a model airplane, the yoke assembly adapted for mounting on a standard radio controller transmitter or RC transmitter, the RC transmitter having a first joystick or left joystick for controlling the plane's throttle and rudder, the RC transmitter having a second joystick or left joystick for controlling the plane's elevators and ailerons, the yoke assembly comprising:

a yoke body adapted for mounting on top of the RC transmitter;

a hand grip mounted in front of the yoke body, the hand grip including a pair of hand grip handles;

a first control arm slidably mounted on the yoke body;

a throttle knob, attached to one end of the first control arm, for moving the first control arm forward and rearward on the yoke body;

first linkage means attached to the first control arm and adapted for attachment to the first joystick, whereby when the throttle knob is moved forward or rearward on the yoke body, the first linkage means for moving the first joystick fore or aft and controlling the throttle on the airplane;

a rudder control lever attached to the first control arm, whereby when the rudder control lever is moved upward or downward, the first linkage means for moving the first joystick left or fight and controlling the rudder on the airplane;

a second control arm slidably mounted on the yoke body, the second control arm having a coil spring mounted there around;

an elevator knob, attached to one end of the second control arm, for moving the second control arm forward or rearward on the yoke body;

second linkage means attached to the second control arm and adapted for attachment to the second joystick, whereby when the elevator knob is moved forward or rearward on the yoke body, the second linkage means for moving the second joystick fore or aft and controlling the elevators on the airplane; and an aileron control lever attached to the second control arm, whereby when the elevator control lever is moved upward or downward, the second linkage means for moving the second joystick left or fight and controlling the ailerons on the airplane.

11. The yoke assembly as described in claim 10 wherein the first linkage means includes a first lever arm attached to the first control arm and a first ball and socket linkage attached to the first lever arm and adapted for attachment to the first joy stick.

12. The yoke assembly as described in claim 11 wherein the second linkage means includes a second lever arm attached to the second control arm and a second ball and socket linkage attached to the second lever arm and adapted for attachment to the second joy stick.

13. The yoke assembly as described in claim 10 further including a vertical post having a threaded upper end attached to the yoke body, a threaded lower end of the vertical post is adapted for attachment to the top of the RC transmitter.

14. The yoke assembly as described in claim 10 further including a stomach rest having a threaded end for attachment to a center of the hand grip, the stomach rest having a round plate adapted for placing against a model plane pilot's stomach for providing stability during the flight operation of the model plane.

15. A model airplane control system for controlling a model airplane, the model airplane having a receiver mounted thereon for receiving radio signals, the control system comprising:

a standard radio controller transmitter or RC transmitter, the RC transmitter having a first joystick or left joystick for controlling the plane's throttle and rudder, the RC transmitter having a second joystick or left joystick for controlling the plane's elevators and ailerons;

a yoke assembly having a yoke body mounted on top of the RC transmitter: a first control arm slidably mounted on the yoke body;

a throttle knob, attached to one end of the first control arm, for moving the first control arm forward and rearward on the yoke body;

first linkage means attached to the first control arm and attached to the first joystick, whereby when the throttle knob is moved forward or rearward on the yoke body, the first linkage means for moving the first joystick fore or aft and controlling the throttle on the airplane;

a rudder control lever attached to the first control arm, whereby when the rudder control lever is moved upward or downward, the first linkage means for moving the first joystick left or fight and controlling the rudder on the airplane;

a second control arm slidably mounted on the yoke body;

an elevator knob, attached to one end of the second control arm, for moving the second control arm forward or rearward on the yoke body;

second linkage means attached to the second control arm and adapted for attachment to the second joystick, whereby when the elevator knob is moved forward or rearward on the yoke body, the second linkage means for moving the second joystick fore or aft and controlling the elevators on the airplane; and an aileron control lever attached to the second control arm, whereby when the elevator control lever is moved upward or downward, the second linkage means for moving the second joystick left or fight and controlling the ailerons on the airplane.

16. The control system as described in claim 15 wherein the first linkage means includes a first lever arm attached to the first control arm and a first ball and socket linkage attached to the first lever arm and adapted for attachment to the first joy stick.

17. The control system as described in claim 16 wherein the second linkage means includes a second lever arm attached to the second control arm and a second ball and socket linkage attached to the second lever arm and attached to the second joy stick.

18. The control system as described in claim 15 wherein the second control arm includes a coil spring therearound for returning the second control arm to a neutral position after the second control arm has been moved forward or rearward.

19. The yoke assembly as described in claim 15 further including a hand grip mounted in front of the yoke body, the hand grip including a pair of hand grip handles.

20. The yoke assembly as described in claim 15 further including a stomach rest having a threaded end for attachment to a center of the hand grip, the stomach rest having a stomach engaging round plate adapted for placing against a model plane pilot's stomach and providing stability during the flight operation of the model plane.

* * * * *